United States Patent [19]

Cooper

[11] Patent Number: 5,387,429
[45] Date of Patent: Feb. 7, 1995

[54] REDUCED CALORIE COCOA BUTTER SUBSTITUTES

[75] Inventor: Charles F. Cooper, Paoli, Pa.

[73] Assignee: Arco Chemical Technology, L.P., Greenville, Del.

[21] Appl. No.: 886,571

[22] Filed: May 20, 1992

[51] Int. Cl.⁶ ............................................. A23D 9/02
[52] U.S. Cl. .................................... 426/611; 426/804
[58] Field of Search ................................ 426/611, 804

[56] References Cited

U.S. PATENT DOCUMENTS

| | | | |
|---|---|---|---|
| 2,610,125 | 9/1952 | Valko | 99/123 |
| 2,924,528 | 2/1960 | Barsky et al. | 99/118 |
| 2,993,063 | 7/1961 | Alsop et al. | 260/410.6 |
| 3,337,595 | 8/1967 | Lamont | 260/410.6 |
| 4,810,516 | 3/1989 | Kong-Chan | 426/548 |
| 4,822,875 | 4/1989 | McCoy et al. | 536/119 |
| 4,849,242 | 7/1989 | Kershner | 426/611 |
| 4,861,613 | 8/1989 | White et al. | 426/611 |
| 4,895,732 | 1/1990 | Suwa et al. | 426/660 |
| 4,983,329 | 1/1991 | Cooper | 260/410.7 |
| 5,023,106 | 6/1991 | Ehrman et al. | 426/660 |
| 5,059,443 | 10/1991 | Ennis et al. | 426/531 |
| 5,066,510 | 11/1991 | Ehrman et al. | 426/607 |
| 5,118,448 | 6/1992 | Cooper | 554/168 |

FOREIGN PATENT DOCUMENTS

| | | |
|---|---|---|
| 396405 | 5/1989 | European Pat. Off. . |
| 350981 | 1/1990 | European Pat. Off. . |
| 353928 | 2/1990 | European Pat. Off. . |
| 396406 | 11/1990 | European Pat. Off. . |
| 415635 | 3/1991 | European Pat. Off. . |
| 433016 | 6/1991 | European Pat. Off. . |
| 481523 | 4/1992 | European Pat. Off. . |
| 1595369 | 4/1970 | Germany . |
| 207070 | 2/1984 | Germany . |
| 55-79313 | 6/1980 | Japan . |
| WO9201386 | 7/1991 | WIPO . |

OTHER PUBLICATIONS

Mieth et al., *Die Nahrung* 27(9), 853 (1983).
Aust et al., *Die Nahrung* 32(1), 49 (1988).

*Primary Examiner*—Carolyn Paden
*Attorney, Agent, or Firm*—Stephen D. Harper

[57] ABSTRACT

Esterified propoxylated glycerin compositions containing acyl groups derived from $C_{12}$–$C_{24}$ saturated linear fatty acids wherein at least 50 mole percent of the total acyl groups are derived from no more than two different such acids are useful as cocoa butter substitutes in the preparation of reduced calorie food products such as chocolate and other confectionaries. The cocoa butter substitutes closely mimic the desirable melting properties of natural cocoa butter and may be conveniently and inexpensively prepared using readily available starting materials.

20 Claims, 1 Drawing Sheet

REDUCED CALORIE COCOA BUTTER SUBSTITUTES

FIELD OF THE INVENTION

This invention relates to fatty acid-esterified propoxylated glycerin compositions which are useful as reduced calorie substitutes for cocoa butter in food products such as chocolate and other confectionaries.

BACKGROUND OF THE INVENTION

Cocoa butter is a natural fat derived by hydraulic or expeller pressing or by solvent extraction of cocoa beans. The unique melting behavior of cocoa butter makes it highly desirable for use in chocolate and similar food products. Unlike other triglycerides obtained from natural sources, cocoa butter exhibits a distinct brittle fracture below 20° C. (68° F.), a fairly sharp and complete melting point at about 35° C. (95° F.) with an incipient fusion or softening around 30°–32° C. (86°–90° F.). A chocolate product comprising cocoa butter thus is solid at room temperature but when consumed melts rapidly at body temperature to provide excellent non-waxy mouthfeel and consistency.

The unique physical properties of cocoa butter are attributable to the particular combination and positional distribution of fatty acid acyl groups on the three carbons of glycerol. Cocoa butter contains approximately equimolar proportions of three major fatty acid acyl groups (palmitate, stearate, oleate), but only three major molecular species despite the possibility of many additional combinations of the dominant fatty acids. Apparently the enzymes present in the maturing cocoa beans are capable of selectively producing these major species.

As natural cocoa butter is relatively expensive compared to other more readily available lipids, considerable effort has been devoted to developing economical processes for synthesizing triglycerides having melting properties analogous to cocoa butter. This objective has proven to be quite difficult to accomplish owing to the inability of conventional esterification methods to position the necessary fatty acid acyl groups regioselectively (i.e., at particular carbon atoms of the glycerol).

The processing of cocoa butter into acceptable confectionary products is complicated by the fact that cocoa butter can exist in several different crystalline forms. As certain of these crystalline forms are unstable, products containing cocoa butter must be carefully tempered and/or seeded to give a smooth crystalline solid of the desired firmness and mouthfeel which will keep satisfactorily without discoloration or bloom.

Another disadvantage of cocoa butter is its high caloric content. Although the chemical composition of cocoa butter is distinctly different from that of other natural oils and fats, it is metabolized in an analogous manner and thus contributes substantially to the energy value of a food composition. Because of the desire of many persons to limit their caloric intake for reasons of health or fitness, a cocoa butter substitute having the same melting properties as natural cocoa butter but fewer calories would be of considerable value.

Certain sucrose fatty acid esters have been proposed for use as reduced calorie cocoa butter substitutes, as described, for example, in U.S. Pat. No. 4,872,875 (McCoy et al.) and European Pat. Publication No. 350,981 (Castenmiller et al.).

Reduced calorie food compositions containing fat-type organoleptic ingredients are also known wherein an esterified epoxide-extended polyol is employed as a full or partial replacement for vegetable oils and fats. Fat substitutes of this type are disclosed in U.S. Pat. No. 4,861,613 (White et al.). However, it has not heretofore been known how to modify and adapt such substances so as to render them suitable for use as cocoa butter replacements.

SUMMARY OF THE INVENTION

Figure 1:
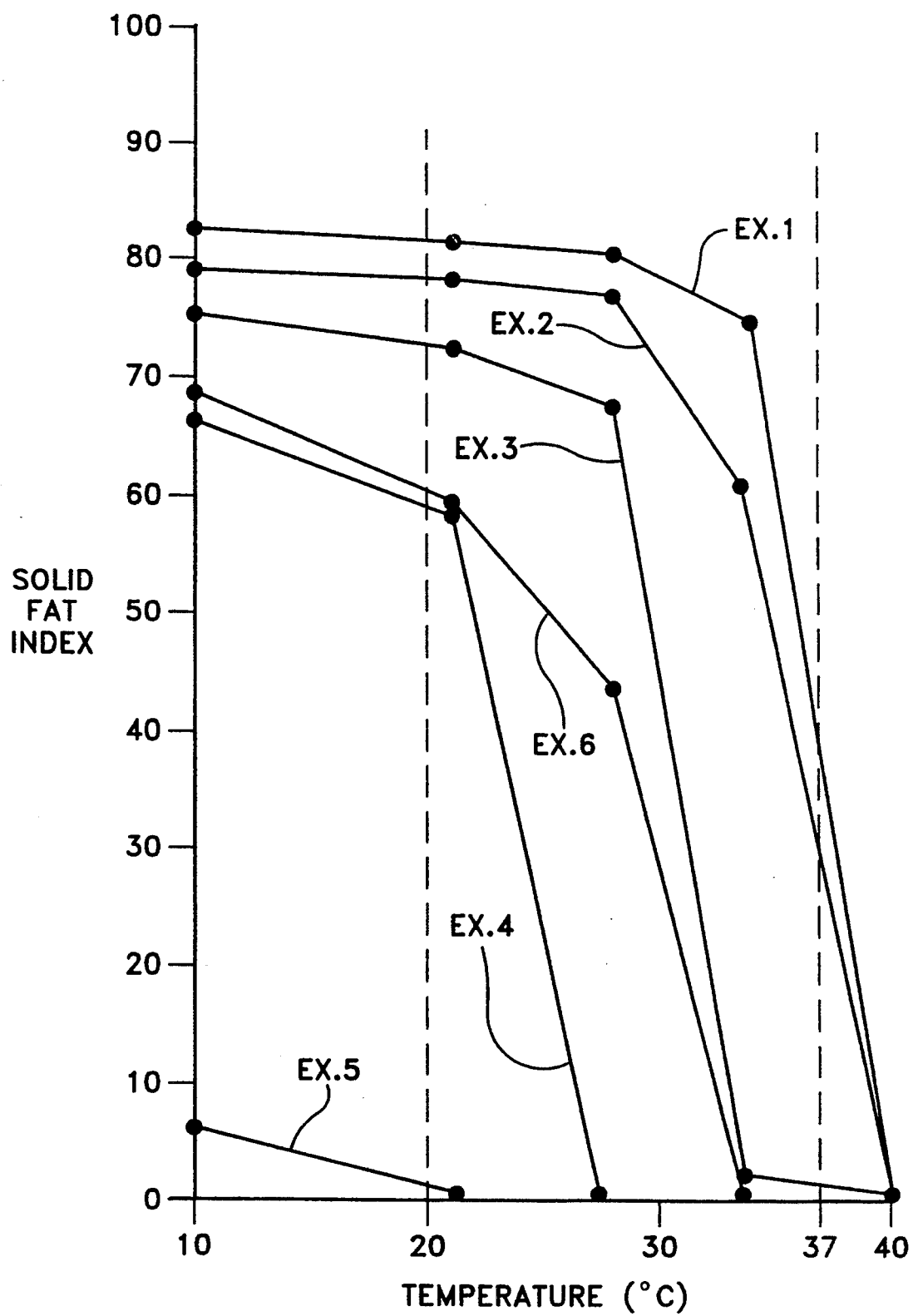
FIG. 1 compares the solid fat index for natural cocoa butter over the temperature range 10°–40° C. to the solid fat indices of various fatty acid-esterified propoxylated glycerin compositions.

This invention provides a reduced calorie food product having a fat component, said fat component comprising a fatty acid-esterified propoxylated glycerin composition having an average number of oxypropylene units per equivalent of glycerin of from 3 to 16, a fatty acid acyl group content such that at least 50 mole percent of the fatty acid acyl groups are derived from no more than two different $C_{12}$–$C_{24}$ saturated linear fatty acids, an iodine number less than 30, and a ratio of average number of fatty acid acyl group carbons per equivalent of glycerin to average number of oxypropylene units per equivalent of glycerin such that the composition has a solid fat index as measured by dilatometry of more than 50 at 20° C. and less than 10 at 37° C.

Also provided by the invention is a reduced calorie cocoa butter substitute comprised of cocoa butter and at least 25 parts by weight per 75 parts by weight cocoa butter of a fatty acid-esterified propoxylated glycerin composition having an average number of oxypropylene units per equivalent of glycerin of from 3 to 16, a fatty acid acyl group content such that at least 50 mole percent of the fatty acid acyl groups are derived from no more than two different $C_{12}$–$C_{24}$ saturated linear fatty acids, an iodine number less than 30, and a ratio of average number of fatty acid acyl group carbons per equivalent of glycerin to average number of oxypropylene units per equivalent of glycerin such that the composition has a solid fat index as measured by dilatometry of more than 50 at 20° and less than 10 at 37° C.

This invention additionally provides a method of reducing the available caloric content of a food product comprised of cocoa butter, said method comprising formulating the food product so as to replace at least a portion of the cocoa butter with a fatty acid-esterified propoxylated glycerin composition having an average number of oxypropylene units per equivalent of glycerin of from 3 to 16, a fatty acid acyl group content such that at least 50 mole percent of the fatty acid acyl groups are derived from no more than two different $C_{12}$–$C_{24}$ saturated linear fatty acids, an iodine number less than 30, and a ratio of average number of fatty acid acyl group carbons per equivalent of glycerin to average number of oxypropylene units per equivalent of glycerin such that the composition has a solid fat index as measured by dilatometry of more than 50 at 20° C. and less than 10 at 37° C.

The invention also provides a fatty acid-esterified propoxylated glycerin composition prepared by reacting 1 equivalent of glycerin with from 3 to 16 equivalent of propylene oxide, preferably under base-catalyzed conditions, to yield a propoxylated glycerin and esterifying the propoxylated glycerin with one or more fatty acids or fatty acid derivatives selected such that the resulting fatty acid-esterified propoxylated glycerin composition has a fatty acid acyl group content wherein at least 50 mole percent of the fatty acid acyl groups are derived from no more than two different $C_{12}$-$C_{24}$ saturated linear fatty acids, an iodine number less than 30, and a solid fat index as measured by dilatometry of more than 50 at 20° C. and less than 10 at 37° C. Preferably, at least about 80% of the hydroxyl groups of the propoxylated glycerin are esterified.

The cocoa butter substitutes of this invention have a markedly reduced tendency to be digested and absorbed so as to provide energy value when consumed as compared to natural cocoa butter. A confectionary made with such a substitute will consequently have far fewer available calories than an analogous confectionary formulated with an equivalent weight or volume of natural cocoa butter. At the same time, the instant cocoa butter mimetics have the advantage of being easily synthesized at low cost from readily available and inexpensive starting materials. In addition, these substances are remarkably similar to natural cocoa butter in their melting properties and thus provide chocolate products and other confectionaries having excellent storage and handling characteristics at room temperature as well as satisfactory organoleptic qualities.

DETAILED DESCRIPTION OF THE INVENTION

In order for the fatty acid-esterified propoxylated glycerin compositions of this invention to function effectively as reduced calorie cocoa butter substitutes, it is essential that the solid fat index as measured by dilatometry be more than 50 at 20° C. and less than 10 at 37° C. As will be explained in more detail subsequently, it has now been unexpectedly found that the melting properties of a fatty acid-esterified propoxylated glycerin composition will mimic the desirable melting properties of cocoa butter when the degree of propoxylation and the type and relative proportions of fatty acid acyl groups present are carefully controlled.

The fatty acid-esterified propoxylated glycerine compositions of this invention contain glyceryl residues, oxypropylene units, and fatty acid acyl

groups. Typically, the compositions are mixtures of individual fatty acid-esterified propoxylated glycerin compounds which may differ from each other in degree of propoxylation and acyl group composition. The glyceryl residue may have the generic structure

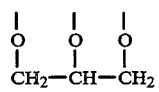

and is derived from glycerin

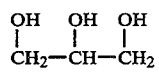

or a glycerin equivalent. The oxypropylene units are generally interspersed between glyceryl residues and the acyl groups and have the structure

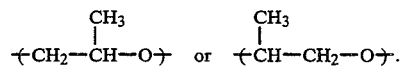

Typically, more than one oxypropylene unit may be present between an oxygen of an individual glyceryl residue and an acyl group such that a polyoxypropylene unit is created. However, a single "branch" or "arm" of the esterified propoxylated glycerin may contain only one oxypropylene unit. Certain of the acyl groups may be attached directly to the glyceryl residue, without any intervening oxypropylene units, although an average of at least three oxypropylene units per glyceryl residue must be present in the overall composition. The average number of oxypropylene units in the esterified alkoxylated glycerin composition is from 3 to 16. The presence of oxypropylene units is critical, as the oxypropylene units help to lower the melting point of the compositions thereby improving the mouthfeel and melting characteristics as compared to analogous compositions not containing oxypropylene units. Surprisingly, even though a number of different molecular species having varying degrees of propoxylation are generally present in the compositions of this invention (i.e., a composition wherein the average number of oxypropylene units per glyceryl is 8 will typically contain substantial proportions of species containing 5, 6, 7, 8, 9, 10, 11, and 12 oxypropylene units), the compositions melt within a remarkably narrow range. That is, the compositions are substantially solid at room temperature and yet melt completely or nearly completely at body temperature, thus closely mimicking the melting behavior of natural cocoa butter. This result was unexpected, since mixtures of organic compounds generally have broad melting ranges.

In order to maximize the resistance of the esterified propoxylated glycerin composition towards pancreatic lipase enzyme-catalyzed hydrolysis, the oxypropylene units adjacent to the acyl groups should be oriented such that secondary rather than primary ester linkages are created. That is, the methyl group should be located on the carbon atom attached to the oxygen atom forming part of the ester linkage as follows:

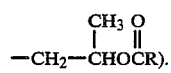

Preferably, at least 80% of the ester linkages in the overall composition are secondary. Most preferably, at least 95% of the ester linkages are secondary.

It is desirable for the esterified propoxylated glycerin composition to be substantially esterified such that it has an average of at least 2.5 (more preferably, at least 2.9) fatty acid acyl groups per equivalent of glycerin. The extent of esterification may be readily determined by conventional analytical methods such as hydroxyl number.

The structure of the composition preferably is such that the composition has a porcine pancreatic lipase hydrolysis rate of less than 20% as compared to an olive oil standard. Preferably, the relative hydrolysis rate is less than 10% of the olive oil rate. Methods of measuring porcine pancreatic lipase hydrolysis rate are described in U.S. Pat. No. 4,861,613 (incorporated herein by reference in its entirety).

The average number of oxypropylene units in the esterified propoxylated glycerin composition must not be so low as to result in a high proportion of the acyl groups being attached directly to glyceryl residues since such directly attached acyl groups will be nearly as susceptible to enzymatic cleavage as the acyl groups in a conventional fully digestible triglyceride, thus reducing the usefulness of the composition as a low calorie fat substitute. At the same time, the average number of oxypropylene units should not exceed 16 since the resulting compounds may be substantially lower in melting point or higher in melt viscosity than natural cocoa butter and thus would not be suitable for use as cocoa butter substitutes.

The solid fat index at 20° C. and 37° may be adjusted as needed by varying the average number of oxypropylene units per glycerin (degree of propoxylation) in the composition. At a constant fatty acid acyl group content (i.e., if the relative proportions of the different acyl groups present are fixed), the solid fat index at a particular temperature will increase as the degree of propoxylation is decreased and will decrease as the degree of propoxylation is increased. As the average number of fatty acid acyl group carbons per equivalent of glycerin decreases or as the iodine number of the composition increases (as a result of increasing the proportion of unsaturated fatty acid acyl groups present), the average number of oxypropylene units per glycerin will need to be decreased to maintain the solid fat index at 20° C. above the critical value of 50. If a particular fatty acid-esterified propoxylated glycerin composition has an undesirably high solid fat index at 37° C. the index may be brought below the critical value of 10 by increasing the degree of propoxylation. By so adjusting the average number of oxypropylene units per equivalent of glycerin, the melting range may be easily controlled so as to mimic that of natural cocoa butter.

The selection of specific structures and proportions of the acyl groups in the esterified propoxylated glycerin compositions of this invention is critical to the capacity of such substances to function as cocoa butter mimetics. It has been unexpectedly discovered that the number of different fatty acid acyl groups must be limited in order to obtain a composition having a suitably sharp melting range. Moreover, the composition must contain a certain minimum proportion of acyl groups derived from $C_{12}$-$C_{24}$ saturated linear fatty acids, as a high content of unsaturated or branched fatty acid acyl groups results in an unacceptable broadening and lowering of the melting range.

This discovery was unexpected in view of the fact that natural cocoa butter contains a high proportion of oleic acid, an unsaturated fatty acid.

For these reasons, at least 50 mole percent of the fatty acid acyl groups in the esterified propoxylated glycerin composition must be derived from no more than two different $C_{12}$-$C_{24}$ saturated linear fatty acids. More preferably, at least 70 mole percent of the acyl groups are so derived. In one embodiment, at least 50 mole percent of the acyl groups are derived from a single $C_{12}$-$C_{24}$ saturated linear fatty acid. "Derived from" in this context means that the acyl group has a long chain hydrocarbyl structure analogous to that present in a $C_{12}$-$C_{24}$ saturated linear fatty acid. As will be explained subsequently, the esterified propoxylated glycerin composition may actually be prepared using either a fatty acid or a fatty acid derivative such as a fatty acid ester, fatty acid halide, or fatty acid anhydride. Generally speaking, it will be desirable to increase the proportion of acyl groups derived from $C_{12}$-$C_{24}$ saturated linear fatty acids as the average number of oxypropylene segments in the composition is increased so as to maintain a solid fat index of 50 or more at 20° C.

In addition, the iodine number (which reflects the proportion of unsaturated fatty acid acyl groups in the composition) must be less than 30, more preferably is less than 20, and most preferably is less than 10 centigrams $I_2$ per gram of the composition. A relatively minor proportion of unsaturated fatty acid acyl groups may be advantageous, however, in order to ensure that the composition does not melt over an excessively narrow range. Iodine number (also referred to as iodine value) may be measured by AOCS method Cd 1-25.

The $C_{12}$-$C_{24}$ saturated fatty acid is linear (i.e., non-branched) and preferably contains only one carboxylic acid functionality. The acyl group may thus correspond to the general structure

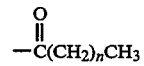

wherein n is an integer of from 10 to 22. The value of n is most conveniently an even number (e.g., 10, 12, 14, 16, 18, 20, or 22) since the corresponding fatty acids are readily available at low cost from natural sources such as edible triglycerides. Specific illustrative fatty acids suitable for use as this component of the esterified propoxylated glycerin compositions include, but are not limited to lauric acid, myristic acid, stearic acid, palmitic acid, eicosanoic (arachidic) acid, heneicosanoic acid, docosanoic (behenic) acid, tricosanoic acid, and tetracosanoic (lignoceric) acid. Mixtures of these $C_{12}$-$C_{24}$ saturated linear fatty acids may also be utilized to advantage.

While all of the acyl groups in the esterified propoxylated glycerin composition may be derived from $C_{12}$-$C_{24}$ saturated linear fatty acid (provided at least 50 mole percent of the acyl groups are derived from no more than two different acids of this type) the compositions may contain minor amounts of acyl groups derived from other $C_8$-$C_{24}$ fatty acids. Preferably, the proportion of such other acyl groups is less than 40%. Generally speaking, the incorporation of acyl groups which are relatively short in length ($C_8$-$C_{18}$), unsaturated, and/or branched will tend to decrease the melting point of the resulting esterified propoxylated glycerin.

The fatty acids which optionally may be used in combination with the required $C_{12}$-$C_{24}$ saturated linear fatty acids may be any of the known fatty acids such as caprylic acid, pelargonic acid, capric acid, oleic acid, cetoleic acid, palmitoleic acid, gadoleic acid, erucic acid, rincinoleic acid, linolenic acid, myristoleic acid, eleostearic acid, arachidonic acid, or mixtures of these acids. Preferably, linear monocarboxylic acids containing from 0 to 5 double bonds are employed.

The proportions and chemical structures of the fatty acid acyl groups in the cocoa butter mimetic compositions of this invention should be selected such that the solid fat index as determined by dilatometry is more than 50 (more preferably, 60) at 20° C. and is less than 10 (more preferably, 5) at 37° C. Increasing the ratio of average number of fatty acid acyl group carbons per equivalent of glycerin to average number of oxypropylene units per equivalent of glycerin will shift the melting range of the composition to a higher temperature while decreasing the ratio will shift the melting range to a lower temperature. The melting curve of the cocoa butter substitute can thus be conveniently matched to that of natural cocoa butter by adjusting this ratio as needed.

The average number of fatty acid acyl group carbons per equivalent of glycerin in the esterified propoxylated glycerin compositions of the invention may be readily calculated from a knowledge of the fatty acid acyl group content (i.e. the chemical structures and relative proportions of the fatty acids used to prepare the compositions). The following formula may be used to calculate this average number for an esterified propoxylated glycerin composition prepared using fatty acids A and B:

$$\frac{\text{moles } A \times \text{no. carbons in } A}{\text{moles propoxylated glycerin}} + \frac{\text{moles } B \times \text{no. carbons in } B}{\text{moles propoxylated glycerin}}$$

For example, a composition prepared by reacting a mixture of 1.5 moles of stearic acid (a $C_{18}$ fatty acid) and 1.5 moles of eicosanoic acid (a $C_{20}$ fatty acid) with 1 mole of propoxylated glycerin containing an average of 7 oxypropylene units per glycerin will have an average of 57 fatty acid acyl carbons per equivalent of glycerin.

To minimize the available caloric content of the esterified propoxylated glycerin cocoa butter substitutes of this invention, the chemical composition should be selected such that the number average molecular weight is at least about 750. More preferably, the minimum molecular weight is about 1000. In order for the esterified propoxylated glycerin composition to mimic as closely as possible the physical properties of cocoa butter (such as melt viscosity and hardness) it is also desirable that the average molecular weight not exceed about 2300. Preferably, the molecular weight is below about 2000.

Particularly preferred embodiments of the invention include the following:

A fatty acid-esterified propoxylated glycerin composition having an average number of oxypropylene units per equivalent of glycerin of from 3 to 5, a fatty acid acyl group content such that at least 70 mole percent of the fatty acid acyl groups are derived from no more than two different $C_{12}-C_{24}$ saturated linear fatty acids, an iodine number less than 10, an average number of fatty acid acyl group carbons per equivalent of glycerin of from 39 to 45, and a solid fat index as measured by dilatometry of more than 50 at 20° C. and less than 10 at 37° C. A fatty acid-esterified propoxylated glycerin composition as described above wherein the average number of oxypropylene units per equivalent of glycerin is from 3 to 7 and the average number of fatty acid acyl group carbons per equivalent of glycerin is from 45 to 51.

A fatty acid-esterified propoxylated glycerin composition as described above wherein the average number of oxypropylene units per equivalent is from 4 to 9 and the average number of fatty acid acyl carbons per equivalent of glycerin is from 51 to 57.

A fatty acid-esterified propoxylated glycerin composition as described above wherein the average number of oxypropylene units per equivalent of glycerin is from 6 to 11 and the average number of fatty acid group carbons per equivalent of glycerin is from 57 to 63.

A fatty acid-esterified propoxylated glycerin composition as described above wherein the average number of oxypropylene units per equivalent of glycerin is from 8 to 14 and the average number of fatty acid acyl carbons per equivalent of glycerin is from 63 to 69.

A fatty acid-esterified propoxylated glycerin composition as described above wherein the average number of oxypropylene units per equivalent of glycerin is from 10 to 16 and the average number of fatty acid acyl group carbons per equivalent of glycerin is from 69 to 75.

The esterified propoxylated glycerin cocoa butter substitutes of this invention may be prepared using any suitable method. In general, the procedures described in the prior art for synthesizing other esterified propoxylated glycerin compositions will be appropriate for use provided that the necessary proportions of $C_{12}-C_{24}$ saturated linear fatty acids or fatty acid derivatives are employed in the esterification step. Such procedures are described, for example, in U.S. Pat. Nos. 4,861,613 and 4,983,329 and in European Patent Publication No. 353,928, the teachings of which are incorporated by reference herein in their entirety. A reduced calorie cocoa butter substitute comprising a mixture of esterified propoxylated glycerins in accordance with this invention can be obtained by adaptation or modification of the esterification procedures described in the above-mentioned publications. Thus, a propoxylated glycerin having an appropriate degree of propoxylation is esterified with fatty acid equivalents selected such that at least about 50 mole percent (more preferably, at least about 70 mole percent) of the fatty acid acyl groups in the resulting mixture are derived from no more than two different $C_{12}-C_{24}$ saturated linear fatty acids. The remaining fatty acid acyl groups, if any, may be derived from $C_8-C_{24}$ fatty acids other than $C_{12}-C_{24}$ saturated linear fatty acids. As is explained in more detail in the above-mentioned publications, either fatty acids or fatty acid equivalents such as fatty acid esters, fatty acid halides, or fatty acid anhydrides may actually be employed in the esterification. The $C_{12}-C_{24}$ saturated linear fatty acid acyl groups may also be introduced by using $C_{12}-C_{24}$ unsaturated fatty acids in the esterification step and then hydrogenating the esterified propoxylated glycerin composition to increase the proportion of $C_{12}-C_{24}$ saturated linear fatty acid acyl groups to the desired level. Any residual free fatty acid remaining in the composition after esterification should preferably be removed or reduced as much as possible to minimize problems with with off flavor, off-odor, or storage stability.

The fatty acid-esterified propoxylated glycerin compositions of the present invention are particularly suitable for use as full or partial replacements for cocoa butter in confectionary products such as chocolate. Typically, a chocolate is comprised of 20 to 55 weight percent of a fat component. To achieve a significant reduction in available caloric content, it will generally be desirable for at least 25 weight percent of the fat component to be a fatty-acid esterified propoxylated glycerin composition of this invention. The amount of the cocoa butter substitute may, if desired, constitute up to 100% of the total fat in the confectionary product. The balance of the fat component may be cocoa butter or a different cocoa butter substitute, equivalent or mimetic (e.g., illipe butter derivatives, sucrose polyester, caprenin, or the like), or some other natural or synthetic lipid. These lipids may be introduced either directly in pure form or as components of food ingredients such as chocolate liquor or cocoa powder containing cocoa butter or milk solids containing milk fats.

Surprisingly, the fatty acid-esterified propoxylated glycerin compositions of this invention are remarkably compatible with natural cocoa butter and may be blended in any proportion with cocoa butter without adversely affecting the melting characteristics of the cocoa butter.

In addition to the fat component comprised of the fatty acid-esterified propoxylated glycerin composition, the food product may further comprise one or more conventional food, confectionary, or chocolate ingredients such as sugars (e.g., sucrose, fructose, glucose, maltose), water, flavorings such as cocoa powder, chocolate liquor, cocoa mass, vanilla or nut or fruit flavorings, milk solids (non-fat, skimmed, or whole), emulsifiers such as lecithin, antioxidants, dietary fibers, vitamins, bulking or bodying agents such as polydextrose or modified starch, salt, and the like. A sugar alcohol such as sorbitol, xylitol, or mannitol or a reduced calorie sweetener such as saccharine, aspartame, cyclamates, sucralose, acesulfame, acesulfam-K, or the like may also be employed in combination with the esterified propoxylated glycerin composition of the invention.

Food products in accordance with the invention may be readily prepared by replacing the cocoa butter component of a standard formulation with the fatty acid-esterified propoxylated glycerin cocoa butter mimetics described hereinabove using known processing methods and techniques. Such methods are described, for example, in Zoumas et al., "Chocolate and Cocoa", *Encyclopedia of Chemical Technology*, Vol. 5, pp 1-19 (1979) and Minifie, *Chocolate, Cocoa and Confectionary Science and Technology*, Avi Publishing Co. (1970), the teachings of which are incorporated herein by reference in their entirety. In general, one part of the fatty acid-esterified propoxylated glycerin composition may directly substitute for one part of cocoa butter in such formulations.

The composition of the present invocation are particularly useful in the preparation of milk chocolate and sweet (dark) chocolate. Chocolate coatings for use on baked goods such as cookies, cakes, doughnuts, pastries, cupcakes may also be readily formulated. The fatty acid-esterified propoxylated glycerin cocoa butter substitute may additionally be utilized in enrobing compositions. Any of the conventional methods for using chocolate compositions to produce a variety of confections and candies can be employed. Such methods include, for example, molding (the casting of liquid chocolate into molds followed by cooling and demolding to yield a solid block, hollow shell, or a shell filled with a confectionary material such as fondant, fudge, or caramel), enrobing (coating confectionary centers with chocolate by putting the centers through a curtain of liquid chocolate followed by cooling), or panning (wherein a rotating pan is used such that the confectionary centers rotate and cascade over one another while the chocolate is applied by hand or spray during rotation and is set by cooling air applied to the revolving pan). A chocolate composition comprised of the fatty acid-esterified propoxylated glycerin composition may be tempered or seeded as needed to achieve the desired mouthfeel and stability.

From the foregoing description, one skilled in the art can readily ascertain the essential characteristics of this invention and, without departing from the spirit and scope thereof, can make various changes and modifications of the invention to adapt it to various usages, conditions, and embodiments.

The following examples further illustrate the cocoa butter mimetics and food compositions of this invention, but are not limitative of the invention in any manner whatsoever.

EXAMPLES 1-7

To illustrate the effect of the average number of oxypropylene units per equivalent of glycerin on the melting characteristics of fatty acid-esterified propoxylated glycerin compositions, the following series of such compositions were synthesized by reacting stearic acid

with different propoxylated glycerin compositions using the procedures described in U.S. Pat. No. 4,983,329. The average number of oxypropylene units per equivalent of glycerin was varied from 0 to 16. In each case, the reaction was carried out until essentially all of the hydroxyl groups of the propoxylated glycerin had been esterified. The solid fat index of each composition at certain temperatures was measured by dilatometry and is shown in Table I below. The melting profile of each composition is illustrated in FIG. 1.

TABLE I

| Example No. | Ave. No. PO/Glycerin[1] | Acyl Carbon/PO[2] | Dilatometric Solid Fat Index | | | | |
|---|---|---|---|---|---|---|---|
| | | | 10.0° C. | 21.1° C. | 26.7° C. | 33.3° C. | 40.0° C. |
| 1* | 3 | 18 | 82.3 | 81.4 | 80.2 | 74.1 | 0.1 |
| 2* | 4 | 13.5 | 79.6 | 78.0 | 76.2 | 60.5 | 0.1 |
| 3 | 5 | 10.8 | 75.0 | 72.0 | 67.5 | 0.1 | 0.0 |
| 4 | 8 | 6.8 | 66.3 | 58.0 | 0.2 | 0.0 | 0.0 |
| 5 | 16 | 3.4 | 6.4 | 0.2 | 0.0 | 0.0 | 0.0 |
| 6* | Cocoa Butter | — | 69.0 | 58.2 | 43.9 | 0.8 | 0.3 |
| 7* | 0 | 0 | did not melt | | | | |

*comparative example
[1] average number of oxypropylene units per equivalent of glycerin
[2] average number of fatty acid acyl group carbons divided by the average number of oxypropylene units per equivalent of glycerin The compositions of Example 1 and 2, which contained an average of 3 or 4 oxypropylene units per equivalent of glycerin and a relatively high ratio of fatty acid acyl group carbons to oxypropylene units, were found to be unsuitable for use as cocoa butter substitutes due to their high melting ranges. In each case, the solid fat index at 37° C. was considerably higher than 10 and as a consequence the compositions had an unacceptable waxy mouthfeel.

The composition of Example 5, which contained an average of 16 oxypropylene units per equivalent of glycerin and a relatively low ratio of average number of fatty acid acyl group carbons per equivalent of glycerin to average number of oxypropylene units per equivalent of glycerin, was also determined to be unsuitable for use as a cocoa butter substitute due to its low melting range. The solid fat index at 20° C. was much lower than the critical value of 50. Such a composition thus could not successfully mimic the organoleptic properties of natural cocoa butter.

In contrast, the melting behavior of the compositions of Examples 3 and 4 respectively containing an average of 5 and 6 oxypropylene units per glycerin equivalent respectively closely matched that of natural cocoa butter (Example 6). In each case, the melting range was desirably sharp (i.e. the composition changes from substantially solid to substantially liquid over a narrow temperature range). Moreover, each composition had a solid fat index at 20° C. greater than 50 and a solid fat index at 37° C. of less than 10. Stearic acid triesters of propoxylated glycerin compositions containing an average of 6 or 7 oxypropylene units per equivalent of glycerin would also be suitable for use as a reduced calorie cocoa butter replacements.

Tristearin (the stearic acid triester of glycerin) was found not to melt appreciably at a temperature of 40° C. (Example 7). This example demonstrates the criticality of incorporating propylene oxide into such a composition to as to lower the melting range to that of natural cocoa butter. Tristearin is additionally unsuitable for use as a reduced calorie cocoa butter substitute since the absence of oxypropylene units results in the substance being highly susceptible to enzymatic hydrolysis and metabolism upon ingestion.

EXAMPLES 8-9

To demonstrate the preparation of a reduced calorie cocoa butter substitute in accordance with this invention which contains a mixture of different types of fatty acid acyl groups, a propoxylated glycerin composition containing an average of about 8 oxypropylene units per equivalent of glycerin was reacted with a mixture of 1 part by weight of an 85% stearic acid/15% stearic acid blend and 3 parts by weight of stearic acid using the esterification methods of U.S. Pat. No. 4,983,329. The average number of fatty acid acyl group carbons per equivalent of glycerin was approximately 56. The melting profile of the resulting esterified propoxylated glycerin composition (Example 8) was found to closely match that of natural cocoa butter (Example 6), as shown in Table II. In contrast, a similar composition prepared using 3 parts of soybean fatty acids (having the approximately composition 0.1% myristic acid, 9.8% palmitic acid, 2.5% stearic acid, 0.4% palmitoleic acid, 28.9% oleic acid, 50.7% linolenic acid, and 6.5% linolenic acid) in place of the 3 parts of stearic acid (Example 9) had a solid fat index at 20° C. much too low for the composition to be suitable for use as a cocoa butter replacement. This example also illustrates the effect on melting profile of increasing the number of different types of fatty acid acyl groups and increasing the proportion of unsaturated fatty acid acyl groups relative to saturated acyl groups.

TABLE II

| Example No. | Iodine Number | Dilatometric Solid Fat Index | | | | |
|---|---|---|---|---|---|---|
| | | 10.0° C. | 21.1° C. | 26.7° C. | 33.3° C. | 40.0° C. |
| 6* | ca. 35 | 69.0 | 58.2 | 43.9 | 0.8 | 0.3 |
| 8 | 0 | 69.4 | 61.6 | 38.2 | 0 | 0 |
| 9* | 75 | 5.4 | 0.8 | 0 | 0 | 0 |

*comparative example

EXAMPLES 10-12

These examples demonstrate the effect of changing the ratio of fatty acid acyl group carbons per glycerin to oxypropylene units per glycerin on the melting profile of an esterified propoxylated glycerin composition. The composition of Example 10 was prepared in a manner identical to that used to prepare the composition of Example 8, except that 1 part of the 85% behenic acid/15% stearic acid blend and 1 part of stearic acid were used in the esterification (sufficient fatty acid was used to accomplish essentially complete esterification of the propoxylated glycerin). In Example 11, 3 parts of the 85% behenic acid/15% stearic acid blend and 1 part of the stearic acid were utilized. As may be seen from Table III, increasing the average chain length of the fatty acid acyl groups shifted the melting range of the composition to a higher temperature. This shift in melting range was sufficient such that neither the Example 10 or Example 11 composition would be suitable for use as in cocoa butter substitute owing to their overly high solid fat index at 37°. However, esterified propoxylated glycerin compositions having fatty acid acyl group contents as in Examples 10 and 11 could readily be modified to more closely mimic the physical properties of cocoa butter by slightly increasing the average number of oxypropylene units per glycerin so as to lower the melting range. For example, this could be accomplished by increasing the average number of oxypropylene units per glycerin in the composition of Example 10 from 8 to 8.3 and in the composition of Example 11 from 8 to 8.7.

TABLE III

| Exmple No. | Acyl Carbons/PO[1] | Dilatometric Solid Fat Index | | | | |
|---|---|---|---|---|---|---|
| | | 10.0° C. | 21.1° C. | 26.7° C. | 33.3° C. | 40.0° C. |
| 4 | 6.8 | 66.3 | 58.0 | 0.2 | 0 | 0 |
| 8 | 7.1 | 69.4 | 61.6 | 38.2 | 0 | 0 |
| 10* | 7.4 | 74.2 | 68.38 | 60.6 | 28 | 0.2 |
| 11* | 7.7 | 82.8 | 75.3 | 71.3 | 49.5 | 16.5 |

[1] average number of fatty acid acyl group carbons divided by the average number of oxypropylene units per equivalent of glycerin
*comparative example

EXAMPLES 12-16

To illustrate the use of other saturated linear fatty acids in accordance with the invention, the series of esterified propoxylated glycerin compositions shown in Table IV is prepared by adaptation of the esterification procedures described in U.S. Pat. No. 4,983,329. In each case the composition is completely esterified (i.e., the hydroxyl value is essentially 0) and has an iodine number less than 5. The melting profiles of the compositions are expected to closely mimic the characteristic melting behavior of natural cocoa butter and yet provide significantly fewer calories when incorporated in a confectionary product owing to their pronounced resistance to lipase hydrolysis and absorption.

TABLE IV

| Example No. | Fatty Acid | No. PO[1] | No. Fatty Acid Acyl Group Carbons per Eq. Glycerin |
|---|---|---|---|
| 12 | myristic | 3 | 42 |
| 13 | palmitic | 5 | 48 |
| 14 | eicosanoic | 9 | 60 |
| 15 | behenic | 12 | 66 |
| 16 | lignoceric | 15 | 72 |

[1]average number of oxypropylene units per equivalent of glycerin

EXAMPLE 17

The preparation of a reduced calorie chocolate product in accordance with the invention is illustrated by this example. The composition of Example 3 (20 parts by weight) and chocolate liquor (14 parts) are mixed together at 130° F. (54° C.) using a Hobart mixer at medium speed. Confectioner's sugar (48 parts) and nonfat milk solids (18 parts) are then added and the ingredients intimately mixed at medium speed for another 45 minutes at the same temperature. The resulting mixture is cooled to 100° F. (38° C.), poured into molds, and held at 60° F. (16° C.) until solid. The chocolate product this obtained has a solid brittle consistency at room temperature and a pleasing non-waxy mouthfeel, yet is substantially lower in available calories than an analogous product prepared using cocoa butter instead of the esterified propoxylated glycerin composition.

EXAMPLE 18

This example demonstrates the use of the cocoa butter mimetics of this invention in reduced calorie enrobed confectionary products.

A chocolate-flavored enrobing composition is prepared by thoroughly blending cocoa powder (104 parts by weight), whole milk solids (194 parts), non-fat milk solids (70 parts), and confectionery sugar (974 parts) and then adding melted chocolate liquor (76 parts) and the composition of Example 3 (360 parts). After thorough blending, the resulting mixture is passed twice through a Lehman four-roll refiner (NIP pressure=200 psi) and then dry-conched 2.5-3 hours at 145° (62.8° C.) using a Hobart C-100 mixer (speed #2). After adding an additional 35 parts of the composition of Example 3 together with 100 parts cocoa butter, the mixing temperature is lowered to 125° F. (51.7° C.) and then wet-conched for 18 hours (speed #1).

The composition of Example 4 (75 parts) and lecithin (2 parts) are then added to the wet-conched mixture and mixed thoroughly. The chocolate-flavored enrobing composition is heated to 120°-125° F. (48.9°-51.7° C.) with mixing for 60 minutes then cooled to 85° F. (29.4° C.). Suitably sized pieces of confectionery candy centers (e.g., caramel, peanuts, walnuts, nougat, toffee, coconut, marshmallow, dried fruit) weighing 8-12 grams each are dropped into the composition to enrobe the centers. After draining the excess enrobing composition, the enrobed pieces are placed on trays and cooled at 10°-21° C. until completely solidified.

EXAMPLE 18

A "sugarless" reduced calorie chocolate coating in accordance with the present invention is prepared using the following ingredients and conventional procuring methods.

| Ingredient | Parts by weight |
|---|---|
| cocoa powder | 5.7 |
| crystalline sorbitol | 40.3 |
| nonfat dry milk | 22.0 |
| Example 3 composition | 31.5 |
| Lecithin | 0.5 |

EXAMPLE 19-23

These examples show the use of the fatty-acid esterified propoxylated glycerin compositions of the invention in various reduced calorie dark chocolate and milk chocolate formulations.

| | Dark Chocolate Formulations | |
|---|---|---|
| | wt % in Formulation | |
| Ingredient | Ex. 19 | Ex. 20 |
| chocolate liquor | 19.0 | 35.0 |
| sugar | 60.0 | 50.4 |
| Example 3 composition | 23.8 | — |
| Example 8 composition | — | 14.2 |
| Lecithin | 0.3 | 0.3 |
| Vanillin | 0.9 | 0.1 |

| | Milk Chocolate Formulations | | |
|---|---|---|---|
| | wt % in Formulation | | |
| Ingredient | Ex. 21 | Ex. 22 | Ex. 23 |
| chocolate liquor | 11.0 | 12.0 | 12.0 |
| dry whole milk | 13.0 | 15.0 | 20.0 |
| sugar | 54.6 | 51.0 | 45.0 |
| Example 3 composition | 21.0 | — | — |
| Example 4 composition | — | 21.6 | — |
| Example 8 composition | — | — | 22.6 |
| Lecithin | 0.3 | 0.3 | 0.3 |
| Vanillin | 0.1 | 0.1 | 0.1 |

I claim:

1. A reduced calorie chocolate flavored confectionary product having a fat component, said fat component comprising a fatty acid-esterified propoxylated glycerin composition having an average number of oxypropylene units per equivalent of glycerin of from 3 to 16, a fatty acid acyl group content such that at least 50 mole percent of the fatty acid acyl groups are derived from no more than two different $C_{12}$-$C_{24}$ saturated linear fatty acids, an iodine number less than 30, and a ratio of average number of fatty acid acyl group carbons per equivalent of glycerin to average number of oxypropylene units per equivalent of glycerin such that the composition has a solid fat index as measured by dilatometry of more than 50 at 20° C. and less than 10 at 37° C.

2. The confectionary product of claim 1 wherein the fatty acid-esterified propoxylated glycerin composition has an iodine number less than 10.

3. The confectionary product of claim 1 wherein the iodine number is less than 10, the average number of oxypropylene units per equivalent of glycerin is from 3 to 5, the average number of fatty acid acyl group carbons per equivalent of glycerin is from 39 to 45, and at least 70 mole percent of the fatty acid acyl groups are derived from no more than two different $C_{12}$–$C_{24}$ saturated linear fatty acids.

4. The confectionary product of claim 1 wherein at least 70 mole percent of the fatty acid acyl groups are derived from no more than two different $C_{12}$–$C_{24}$ saturated linear fatty acids.

5. The confectionary product of claim 1 wherein the $C_{12}$–$C_{24}$ saturated linear fatty acids are selected from the group consisting of lauric acid, myristic acid, palmitic acid, stearic acid, eicosanoic acid, behenic acid, and lignoceric acid.

6. The confectionary product of claim 1 wherein the fatty acid-esterified propoxylated glycerin composition has a porcine pancreatic lipase hydrolysis rate of below 20% compared to olive oil.

7. The confectionary product of claim 1 wherein the fatty acid-esterified propoxylated glycerin composition has an average of at least 2.5 fatty acid acyl groups per equivalent of glycerin.

8. The confectionary product of claim 1 wherein at least 85 percent of the fatty acid acyl groups of the fatty acid-esterified propoxylated glycerin composition are bonded to oxypropylene units through a secondary ester linkage.

9. The confectionary product of claim 1 wherein the iodine number is less than 10, the average number of oxypropylene units per equivalent of glycerin is from 3 to 7, the average number of fatty acid acyl group carbons per equivalent of glycerin is from 45 to 51, and at least 70 mole percent of the fatty acid acyl groups are derived from no more than two different $C_{12}$–$C_{24}$ saturated linear fatty acids.

10. The confectionary product of claim 1 wherein the average number of oxypropylene units per equivalent of glycerin is from 4 to 9, the iodine number is less than 10, the average number of fatty acid acyl group carbons per equivalent of glycerin is from 51 to 57, and at least 70 mole percent of the fatty acid acyl groups are derived from no more than two different $C_{12}$–$C_{24}$ saturated linear fatty acids.

11. The confectionary product of claim 1 wherein the average number of oxypropylene units per equivalent of glycerin is from 6 to 11, the iodine number is less than 10, the average number of fatty acid acyl group carbons per equivalent of glycerin is from 57 to 63, and at least 70 mole percent of the fatty acid acyl groups re derived from no more than two different $C_{12}$–$C_{24}$ saturated linear fatty acids.

12. The confectionary product of claim 1 wherein the average number of oxypropylene units per equivalent of glycerin is from 8 to 14, the iodine number is less than 10, the average number of fatty acid acyl group carbons per equivalent of glycerin is from 63 to 69, and at least 70 mole percent of the fatty acid acyl groups are derived from no more than two different $C_{12}$–$C_{24}$ saturated linear fatty acids.

13. The confectionary product of claim 1 wherein the average number of oxypropylene units per equivalent of glycerin is from 10 to 16, the iodine number is less than 10, the average number of fatty acid acyl group carbons per equivalent of glycerin is from 69 to 75 and at least 70 mole percent of the fatty acid acyl groups are derived from no more than two different $C_{12}$–$C_{24}$ saturated linear fatty acids.

14. The confectionary product of claim 1 wherein said fatty acid-esterified propoxylated glycerin composition comprises at least 25% by weight of said fat component.

15. A reduced calorie cocoa butter substitute comprised of cocoa butter and at least 25 parts by weight per 75 parts by weight cocoa butter of a fatty acid-esterified propoxylated glycerin composition having an average number of oxypropylene units per equivalent of glycerin of from 3 to 16, a fatty acid ester group content such that at least 50 mole percent of the fatty acid acyl groups are derived from no more than two different $C_{12}$–$C_{24}$ saturated linear fatty acids, an iodine number less than 30, and a ratio of average number of fatty acid acyl group carbons per equivalent of glycerin to average number of oxypropylene units per equivalent of glycerin such that the composition has a solid fat index as measured by dilatometry of more than 50 at 20° C. and less than 10 at 37° C.

16. The cocoa butter substitute of claim 15 wherein the average number of oxypropylene units per equivalent of glycerin is from 4 to 9 and the average number of fatty acid acyl group carbons per equivalent of glycerin is from 51 to 57.

17. The cocoa butter substitute of claim 15, wherein the $C_{12}$–$C_{24}$ saturated linear fatty acids are selected from the group consisting of lauric acid, myristic acid, palmitic acid, stearic acid, eicosanoic acid, behenic acid, and lignoceric acid.

18. The cocoa butter substitute of claim 15 wherein the fatty acid-esterified propoxylated glycerin composition has an average of at least 2.5 fatty acid acyl groups per equivalent of glycerin.

19. A method of reducing the available caloric content of a chocolate flavored confectionary product comprised of cocoa butter, said method comprising replacing at least a portion of the cocoa butter with a fatty acid-esterified propoxylated glycerin composition having an average number of oxypropylene units per equivalent of glycerin of from 3 to 16, a fatty acid acyl group content such that at least 50 mole percent of the fatty acid acyl groups are derived from no more than two different $C_{12}$–$C_{24}$ saturated linear fatty acids, an iodine number less than 30, and a ratio of average number of fatty acid acyl group carbons per equivalent of glycerin to average number of oxypropylene units per equivalent of glycerin such that the composition has a solid fat index as measured by dilatometry of more than 50 at 20° C. and less than 10 at 37° C.

20. The method of claim 19 wherein at least 25 weight percent of the cocoa butter is replaced with the fatty acid-esterified propoxylated glycerin composition.

* * * * *